United States Patent
Stammers et al.

(10) Patent No.: US 10,341,126 B2
(45) Date of Patent: Jul. 2, 2019

(54) SYSTEM AND METHOD TO FACILITATE FLOW IDENTIFICATION IN A NETWORK ENVIRONMENT

(71) Applicant: CISCO TECHNOLOGY, INC., San Jose, CA (US)

(72) Inventors: Timothy P. Stammers, Raleigh, NC (US); Ian McDowell Campbell, Bow Mar, CO (US)

(73) Assignee: Cisco Technology, Inc., San Jose, CA (US)

( * ) Notice: Subject to any disclaimer, the term of this patent is extended or adjusted under 35 U.S.C. 154(b) by 68 days.

(21) Appl. No.: 15/624,592

(22) Filed: Jun. 15, 2017

(65) Prior Publication Data
US 2018/0367321 A1 Dec. 20, 2018

(51) Int. Cl.
| | | |
|---|---|---|
| H04L 9/32 | (2006.01) | |
| H04L 12/14 | (2006.01) | |
| H04L 12/851 | (2013.01) | |
| H04L 12/801 | (2013.01) | |
| H04W 4/24 | (2018.01) | |
| H04W 12/08 | (2009.01) | |
| H04W 12/10 | (2009.01) | |
| H04L 12/26 | (2006.01) | |
| H04L 12/721 | (2013.01) | |
| H04L 29/06 | (2006.01) | |

(52) U.S. Cl.
CPC ........ *H04L 12/1407* (2013.01); *H04L 43/026* (2013.01); *H04L 45/38* (2013.01); *H04L 47/2441* (2013.01); *H04L 47/35* (2013.01); *H04W 4/24* (2013.01); *H04W 12/08* (2013.01); *H04W 12/10* (2013.01); *H04L 63/0428* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 7,209,458 B2 | 4/2007 | Ahvonen et al. | |
| 7,826,353 B2 | 11/2010 | Honkasalo et al. | |
| 2004/0223602 A1 | 11/2004 | Honkasalo et al. | |
| 2012/0185695 A1* | 7/2012 | Shah | H04L 9/0822 713/172 |

(Continued)

OTHER PUBLICATIONS

PCT Notifcation of Transmittal of The International Search Report and The Written Opinion of the International Searching Authority, or the Declaration for Application No. PCT/US2018/036100 dated Sep. 19, 2018.

*Primary Examiner* — Sithu Ko
(74) *Attorney, Agent, or Firm* — Patterson + Sheridan, LLP

(57) ABSTRACT

An example method is provided in one example embodiment and may include generating a content token, wherein the content token is generated for a particular content type of a particular application service based on a trust relationship established between the particular application service and a mobile service provider; and embedding the content token in one or more packets of a plurality of packets sent to a user equipment (UE) for one or more Internet Protocol (IP) flows associated with the particular content type, wherein the content token is embedded in an unencrypted portion of each packet that is separate from an encrypted data payload portion of each packet.

20 Claims, 7 Drawing Sheets

(56) References Cited

U.S. PATENT DOCUMENTS

| | | |
|---|---|---|
| 2013/0235802 A1 | 9/2013 | Moussa et al. |
| 2014/0282986 A1* | 9/2014 | Leung ................ H04L 63/0807 726/9 |
| 2016/0277953 A1 | 9/2016 | Andersson et al. |
| 2017/0054688 A1 | 2/2017 | Bhattacharjee et al. |

* cited by examiner

100

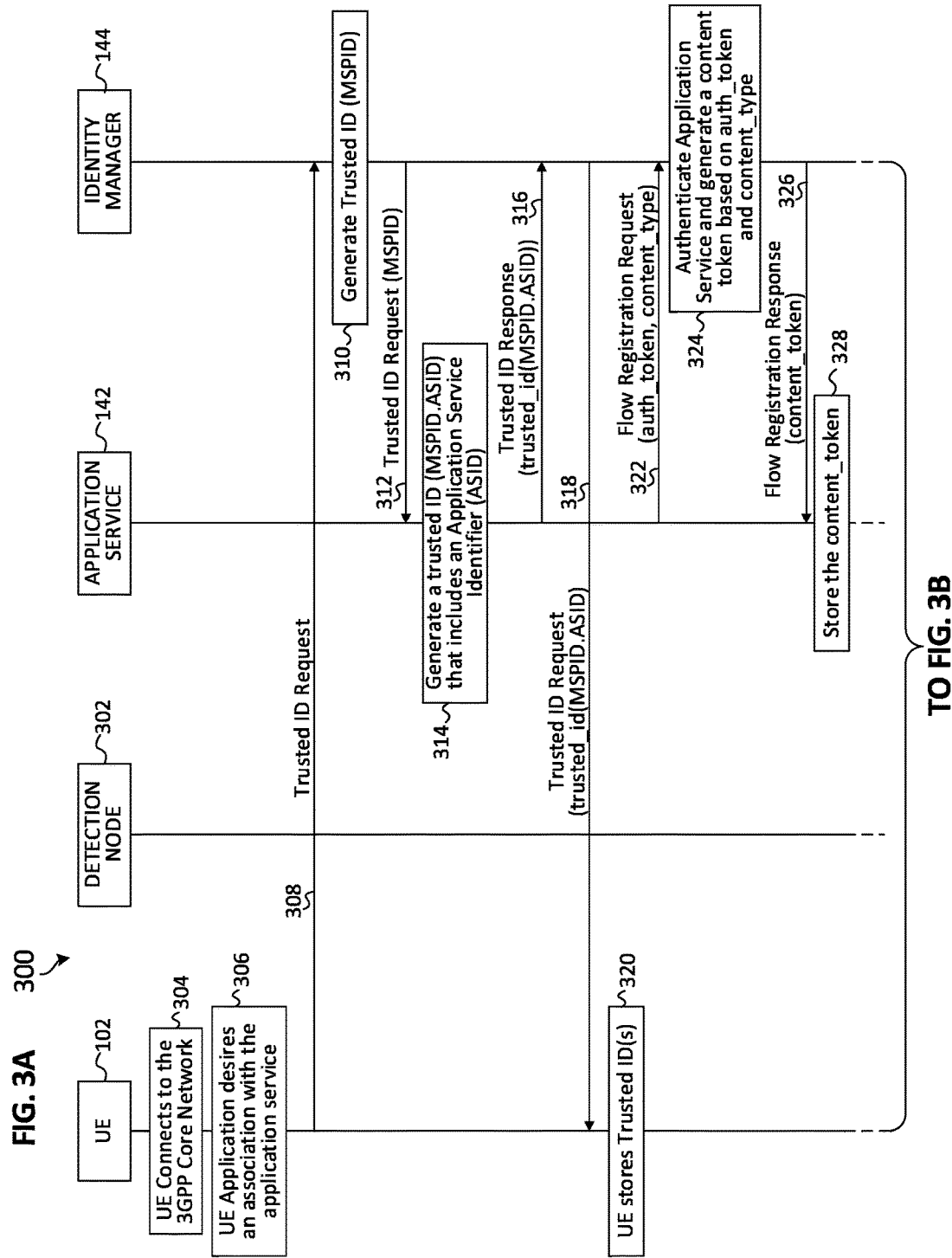

SYSTEM AND METHOD TO FACILITATE FLOW IDENTIFICATION IN A NETWORK ENVIRONMENT

TECHNICAL FIELD

This disclosure relates in general to the field of communications and, more particularly, to a system and method to facilitate flow identification in a network environment.

BACKGROUND

Networking architectures have grown increasingly complex in communications environments, particularly mobile wireless environments. For example, mobile service providers, network operators, and/or third party developers are continually seeking to enrich mobile subscriber experience through the introduction of new services and applications. With the introduction of new features, there exists a need to identify Internet Protocol (IP) flows in order to apply different charging and packet treatment to mobile subscribers for the features to which they subscribe. However, encryption of IP packet content presents significant challenges to mobile service providers, network operators, third party service providers and/or developers, application service providers, Over-The-Top (OTT) service providers, or the like to identify IP flows.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3B are a simplified interaction diagram illustrating other example details that can be associated with providing flow identification in a network environment in accordance with one potential embodiment;

DETAILED DESCRIPTION OF EXAMPLE EMBODIMENTS

Overview

Figure 1:
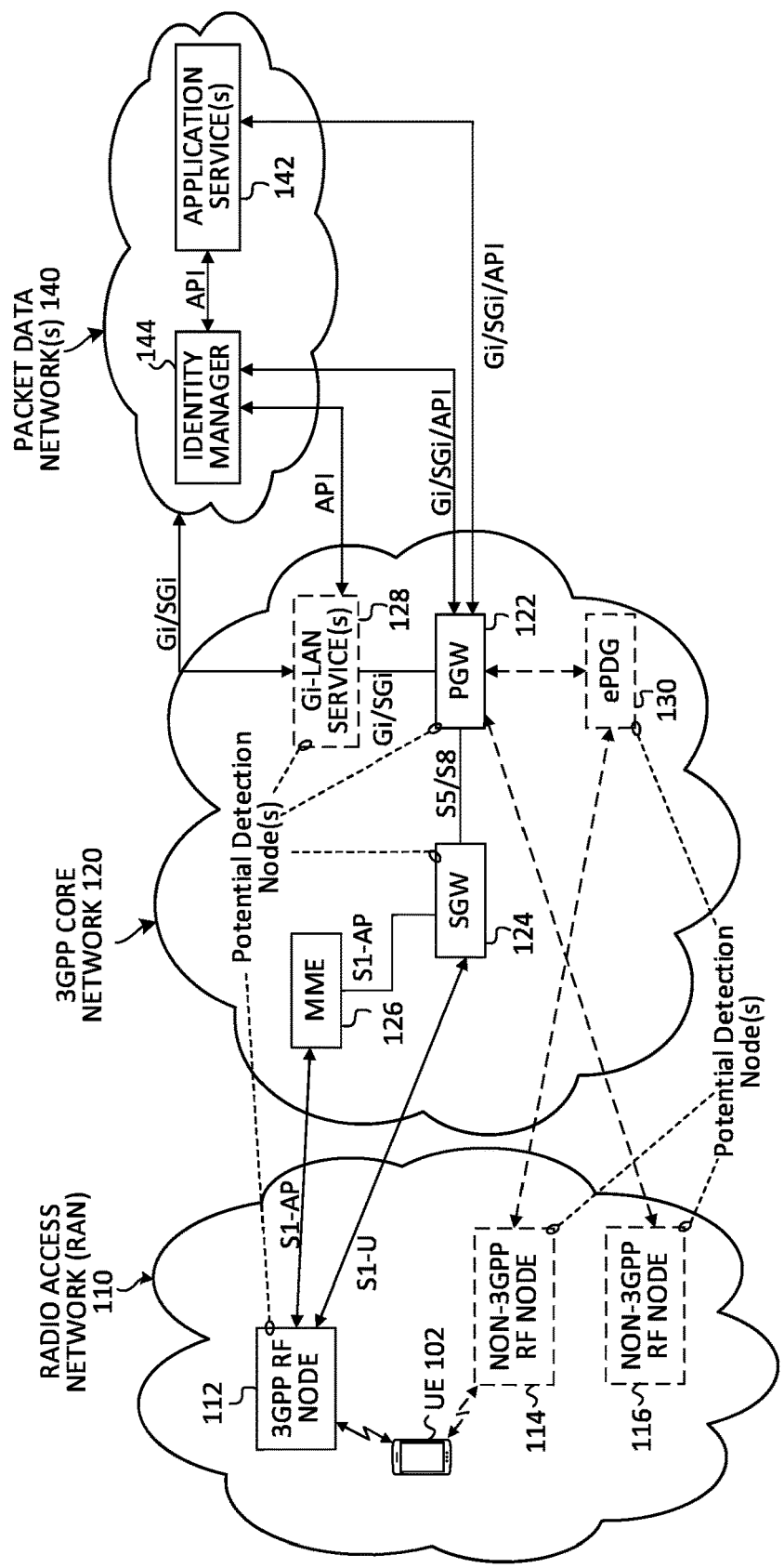
FIG. 1 is a simplified block diagram illustrating a communication system that can facilitate flow identification in a network environment according to one embodiment of the present disclosure.

A method is provided in one example embodiment and may include generating a content token, wherein the content token is generated for a particular content type of a particular application service based on a trust relationship established between the particular application service and a mobile service provider; and embedding the content token in one or more packets of a plurality of packets sent to a user equipment (UE) for one or more Internet Protocol (IP) flows associated with the particular content type, wherein the content token is embedded in an unencrypted portion of each packet that is separate from an encrypted data payload portion of each packet. The generating can include communicating a registration request from an application service to an identity manager to request the content token for the particular content type, wherein the identity manager is associated with the mobile service provider and the particular application service is not associated with the mobile service provider; generating the content token by the identity manager; and communicating the content token to the application service. The registration request can include an authorization token that identifies the trust relationship between the particular application service and the identity manager. The identity manager and the particular application service can be provisioned external to a 3rd Generation Partnership Project (3GPP) core network. The content token can be a globally unique value in relation to one or more other content tokens that can be generated for one or more other application services and one or more other content types.

In some cases, the method can include receiving, by the identity manager, a request from the UE for a trust identifier (ID) for the UE that can be associated with the particular application service; generating the trust ID by the identity manager; communicating the trust ID to the particular application service; appending the trust ID with an application ID associated with the particular application service; and communicating to the UE at least one of: the trust ID and the application ID associated with the particular application service; and one or more other trust IDs and other application IDs associated with one or more other application services.

In some instances, the method can include receiving, by the particular application service, a content validation request from the UE associated with the particular content type, wherein the content validation request comprises the trust ID, the application ID, and an identifier that identifies the particular content type; determining by the particular application service whether the UE is authorized to receive the particular content type based on the trust ID and the application ID; and communicating the content token to the UE based on a determination that the UE is authorized to receive the particular content type. In still some instances, the method can include receiving, by the particular application service, a content request from the UE for the particular content type, wherein the content token is included in the content request; embedding the content token in a packet that includes content associated with the particular content type; and communicating the packet to the UE.

In some cases, the method can further include at least one of: provisioning a data-plane packet processing node with the content token by communicating to the data-plane packet processing node a policy push message that comprises the content token; and configuring a data-plane packet processing node with the content token by the mobile service provider. In some instances, the method can further include detecting, by the data-plane processing node, the content token embedded in at least one packet for at least one IP flow; and performing one or more additional operations based on the detecting, wherein the one or more additional operations comprise at least one of: generating application related data for the at least one IP flow for the UE; assigning a charging rule to the at least one IP flow for the UE; and applying a policy to the at least one IP flow for the UE.

Example Embodiments

Turning to FIG. 1, FIG. 1 is a simplified block diagram illustrating a communication system 100 to facilitate flow identification in a network environment according to one embodiment of the present disclosure. In one embodiment, the configuration illustrated in FIG. 1 may be tied to a 3rd Generation Partnership Project (3GPP) architecture such as, for example, an Evolved-Universal Mobile Telecommunications System (UMTS) Terrestrial Radio Access Network (E-UTRAN). The E-UTRAN architecture, generally referred to as 4th Generation (4G)/Long Term Evolution (LTE) architecture, can interface with an Evolved Packet System (EPS) core, generally referred to as the Evolved Packet Core (EPC). Alternatively, the depicted architecture can be applicable to other environments equally such as, for example, 5th Generation (5G) New Radio (NR) architectures and/or virtualized architectures such as, for example, a virtualized core and/or virtualized RAN (vRAN) architecture.

As referred to herein in this Specification, the term 'plane' can refer to a separation of traffic that can traverse a network. Three planes can typically be found in communication networks including: a data-plane, a control-plane and a management-plane. The data-plane typically carries user traffic, while the control-plane typically carries signaling traffic used to provide routing information for user traffic and the management-plane, a subset of the control plane, typically carries administrative traffic. As referred to herein in this Specification, the terms 'user-plane', 'data-plane' and 'user data-plane' can be used interchangeably.

The example architecture of FIG. 1 for communication system 100 includes a user operating user equipment (UE) 102, a radio access network (RAN) 110, a 3GPP core network 120, and one or more packet data network(s) (PDN(s)) 140. RAN 110 can include a number of Radio Frequency (RF) nodes including a 3GPP RF node 112 and, in some embodiments, non-3GPP RF nodes 114, 116. 3GPP core network 120 can include a PDN Gateway (PGW) 122, a Serving Gateway (SGW) 124, and a Mobility Management Entity (MME) 126. An identity manager 144 and one or more application service(s) can be provisioned for one or more PDN(s) 140. In some embodiments, one or more Gi-Local Area Network (Gi-LAN) service(s) 128 and/or an evolved PDN Gateway (ePDG) 130, in any combination.

In various embodiments, PDN(s) 140 can include, but not be limited to, the Internet, operator Internet Protocol (IP) services (e.g., IP Multimedia Subsystem (IMS) services such as Voice over LTE (VoLTE)), third-party service(s), service network(s), enterprise networks, combinations thereof, or the like.

Each of the elements of FIG. 1 may couple to one another through simple interfaces or through any other suitable connection (wired or wireless), which provides a viable pathway for network communications. As referred to herein, a physical (wired or wireless) interconnection or interface can refer to an interconnection of one element or node with one or more other element(s), while a logical interconnection or interface can refer to communications, interactions, and/or operations of elements with each other, which can be directly or indirectly interconnected, in a network environment. Physical and/or logical interfaces can be provided between various network elements of communication system 100 any manner depending on needs and implementations to facilitate IP flow identification operations as discussed for various embodiments described herein.

Network elements (e.g., 3GPP RF node 112, non-3GPP RF nodes 114 and/or 116, if implemented, PGW 122, SGW 124, MME 126, etc.) within RAN 110 and 3GPP core network 120 can interface with one another in any manner as may be defined by 3GPP standards (e.g., 3GPP TS 23.402, etc.), Internet Engineering Task Force (IETF) standards, European Telecommunications Standards Institute (ETSI) standards, Institute of Electrical and Electronics Engineers® (IEEE) standards (e.g., 802.11, 802.16, etc.), Wi-Fi Alliance® standards, combinations thereof, or the like to facilitate IP flow identification operations in accordance with teachings of the present disclosure.

For example, UE 102 can interface with 3GPP RF node 112 and/or one or more non-3GPP RF node simultaneously or separately via a respective over-the-air (OTA) RF communication link with each RF node. 3GPP RF node 112 can interface with MME 126 via an S1-Application Protocol (S1-AP) control-plane interface and can interface with SGW 124 via an S1-user data-plane (S1-U) interface. MME 126 can further interface with SGW 124 via an S11 control-plane interface. SGW 124 can further interface with PGW 122 via an S5 and/or S8 data-plane interface. In general, the S8 interface is used when a UE is roaming between different network operators and the S5 interface is a network internal interface for a particular network operator. PGW 122 can further interface with ePDG 130, if implemented, via an S2b interface; can further interface with PDN(s) 160 and Gi-LAN service(s) 128, if implemented, via a Gi and/or SGi (Gi/SGi) interface with each PDN and/or Gi-LAN service(s); can further interface with identity manager 144 using any combination of Gi, SGi, and/or Application Programming Interface (API) interface (Gi/SGi/API); and can further interface with one or more application service(s) 142 via a Gi/SGi/API interface with each application service. Identity manager 144 can be provisioned within a packet data network 140 by a mobile service provider (e.g., AT&T®, T-Mobile®, Sprint®, Vodafone®, etc.) and can interface via an API with one or more application service(s) 142 and with Gi-LAN service(s) 128, if implemented. In various embodiments, an API can include various messaging and/or signaling constructs, protocols, or the like to facilitate messaging and signaling between PGW 122 and identity manager 144, between PGW 122 and application service(s) 142, between identity manager 144 and Gi-LAN service(s), if implemented, and between identity manager 144 and application service(s) 142 implemented or otherwise provisioned by an application service provider or a mobile service provider.

Before detailing various features of communication system 100, certain contextual information is provided to understand traditional techniques for identifying IP flows. Such information is offered earnestly and for teaching purposes only and, therefore, should not be construed in a way to limit the broad applications and teachings of the present disclosure.

As referred to herein in this Specification, an IP flow can refer to a sequence of packets that can be identified using various identification information that accompanies each IP packet of the IP flow. The association of packet flows with applications, services, and user subscriptions for the purposes of applying charging strategies has been a cornerstone of the monetization strategies for mobile service providers.

Historically, this association has been achieved using various packet inspection strategies, to determine a tuple (e.g., 7-tuple, 5-tuple, 2-tuple, etc.) of packet header information (e.g., a transport layer header, a network layer header, etc.) has been used to identify packet flows. Inspection strategies to determine 5-tuple packet information typically involve identifying a source IP address, a destination IP address, a source port, a destination port and a transport protocol for a packet. In some cases, Layer 7 (L7) inspection techniques such as Uniform Resource Locator (URL) inspection, heuristic analysis, Domain Name Server (DNS) snooping, etc. can be used to identify an IP flow. However, the rapid growth of encryption invalidates many of these techniques.

In accordance with at least one embodiment, communication system 100 can facilitate IP flow identification through use of a trusted identity content token that is generated based on a trust relationship established between a provider of an application service and a mobile service provider for particular content associated with the application service to provide a foundation for flow identification. A provider of an application service is referred to herein in this Specification as an 'application service provider'. As referred to herein in this Specification, the term 'trust' and variations thereof can refer to a level of security or a security association between an application service provider and a mobile service provider that can be extended to one or more IP flows associated with one or more content types that may be exchanged between the application service and one or more UE. Trusted identity content tokens can be carried un-encrypted in packet(s) of one or more IP flow(s) to enable data-plane packet processing nodes that are trusted to use such trusted identity content tokens to perform additional operation(s) based on identification of such tokens in one or more packet(s) of one or more IP flow(s).

A respective globally unique trusted identity content token can be generated by identity manager 144 that is application specific and content type specific for each of a respective content type that may be offered by a respective application service. Thus, a trusted identity content token can be a global identifier of a particular type of content provided by a particular application service. In various embodiments, trusted identity content tokens can be generated using subscriber independent generation methods or can be generated using subscriber dependent generation methods, as discussed in further detail herein. As referred to herein in this Specification, the terms 'application service' and 'application' can be referred to interchangeably.

During operation, following subscriber independent or subscriber dependent generation of a trusted identity content token associated with a particular content type of a particular application service, referred to herein as 'application service content', the trusted identity content token can be embedded (e.g., tagged, appended, or otherwise included in a packet) in a visible, unencrypted field (e.g., visible to a data-plane packet processing detection node such as an RF node, SGW 124, PGW 122, Gi-LAN service(s) 128, ePDG 130, etc.) for one or more packets of one or more IP flow(s) associated with the application service content to enable various data-plane packet processing (e.g., detection) node(s) to identify the IP flow based on the trusted identity content token.

In at least one embodiment, an unencrypted field that may be included with an IP packet can be a User Datagram Protocol (UDP)-based Path Layer UDP Substrate (PLUS) field that can be added, unencrypted, to every PLUS packet header for every packet of a particular IP flow. Although the PLUS field can be carried unencrypted in each UDP packet, the implicit meaning of the content of the packet can be securely hidden from "middle boxes" (e.g., detection nodes) that may only need to identify a particular packet as being associated with a general application-specific content type in order to apply install and/or apply one or more charging rules to a flow of packets. One application of embodiments of communication system 100 can include flow identification in the presence of the Quick UDP Internet Connection (QUIC) protocol, as defined by the Internet Engineering Task Force (IETF). However, it should be understood that other methods can be used to carry an unencrypted field in IP packets having other encrypted content and/or fields contained therein in accordance with various embodiments of communication system 100. For example, in some embodiments an unencrypted field can be included in other headers or trailers included with packets.

The integrity of the end device client (e.g., UE 102) can be such that this token is only associated with the correct flows. A trust and business association between a mobile service provider and an application service provider can be sufficient to guarantee a trust relationship between a UE of a given application service provided by the application service provider.

During operation, a same trusted identity content token derived for a given application, which can be subscriber dependent or subscriber independent, as discussed for various embodiments herein, can be provided by identity manager 144 to data-plane packet processing node(s) in the flow path of an IP flow associated with a given UE (e.g., UE 102). In some embodiments, trusted identity content token(s) for one or more application service(s) could be provided via a policy push or by authorizing an IP flow for which a derived trusted identity content token has not yet been authorized by a packet processing node. In still some embodiments, trusted identity content token(s) for one or more application service(s) could be preconfigured prior to policy push actions. For example, in such embodiments, a Mobile Service Provider (MSP) and an Application Service Provider (ASP) could negotiate token(s) to be used for one or more applications and could preconfigure or define the negotiated token(s) in various data-plane packet processing node(s).

For data-plane packet processing nodes, matching, by a given packet processing node, a derived identity token present in packets to one of the set of trusted identity content tokens known to the packet processing nodes can, in at least one embodiment, enable the packet processing node to identify packets as being of a certain type, which can be used to trigger additional operations (e.g., charging, gating, etc.) to be applied to the packets. In some embodiments, data-plane processing node(s) might receive an indication from identity manager 144 (e.g., via an API, etc.) that enables the node(s) to be able to identify certain trusted identity content tokens as being associated with application services or service types (e.g., a home automation service or service type, a Low Power Network (LPN) service or service type, a streaming content service or service type, etc.). Thus, in some embodiments, trusted identity content tokens can be mapped to some configuration for data-plane packet processing nodes that defines what service or service type to which certain content tokens might be associated.

By enabling detection of IP flows based on application-specific trusted identity content tokens, packet processing nodes can generate application related data such as for example, packet and/or byte counts, diagnostics, flow records, etc.; can apply charging; can enforce and/or apply polices; combinations thereof; or the like based on associations of various operations (e.g., data generation, charging, policy application, policy enforcement, etc.) with derived identity tokens for identification by systems (e.g., packet processing detection nodes) trusted to use the tokens.

The system and method provided by communication system 100 builds on concepts of trusted shared identity management to derive secure identity tokens for packet identification. Thus, communication system 100 provides an identity management system that is based on an inherent trust relationship established between a mobile service provider and an application service provider. Based on these trust relationships, identity manager 144 can derive application service-based trusted identity content tokens, which can facilitate encrypted packet IP flow identification by packet processing (e.g., detection) nodes.

The system and method provided by communication system 100 can provide various advantages in various embodiments. For example, in at least one embodiment, the system and method provides for the integration of a cooperative secure identity with packet identification techniques, which can reduce packet processing burdens (e.g., Deep Packet Inspection (DPI), etc.) by packet processing nodes along the path of IP flows. In another embodiment, as the system and method provided by communication system does not require DPI techniques to inspect encrypted packets, flow identification tokens can be carried unencrypted in a UDP packet header, or the like, which can enable cost-effective distributed forwarding strategies that can retain and improve IP flow analysis measures. In yet another embodiment, the system and method provided by communication system 100 can permit mobile service providers to continue to monetize flow analysis for charging, accounting, and/or diagnostic purposes in the presence of encrypted packet payloads. Accordingly, the system and method provided by communication system 100 can enable 'middle-boxes' (e.g., detection nodes) with the ability to provide IP flow characteristic data that can support monetization strategies.

Figure 2:
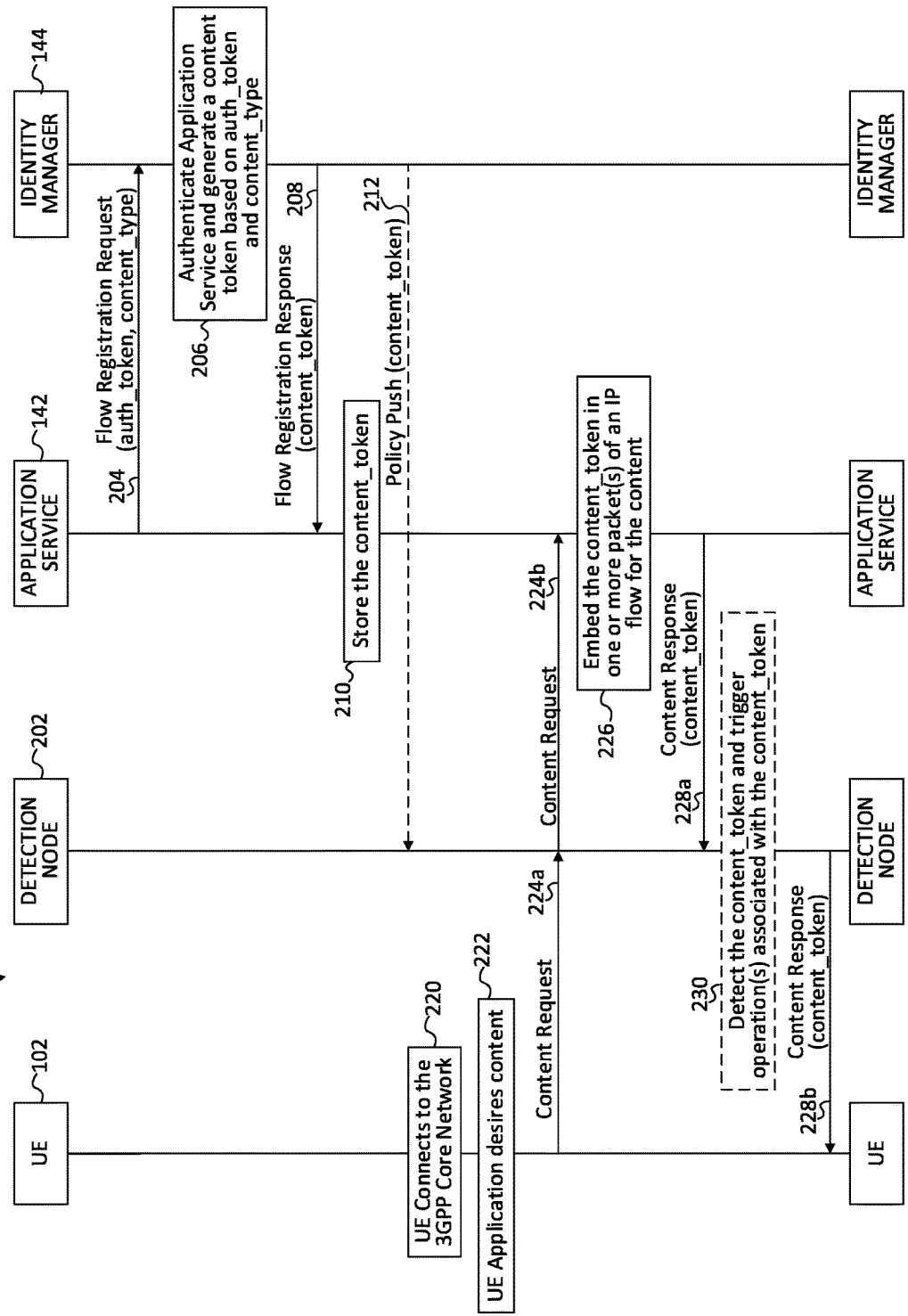
FIG. 2 is a simplified interaction diagram illustrating example details that can be associated with providing flow identification in a network environment in accordance with one potential embodiment of the present disclosure.

Turning to FIG. 2, FIG. 2 is a simplified interaction diagram 200 illustrating example details that can be associated with providing flow identification in accordance with one potential embodiment. In particular, the embodiment of FIG. 2 illustrates example details that can be associated with interactions and operations that can be performed within communication system 100 involving subscriber independent trusted identity content token generation. The embodiment of FIG. 2 includes UE 102, a given detection node 202, a given application service 142, and identity manager 144. In various embodiments, detection node 202 can represent any data-plane packet processing node (e.g., any RF node 112, 114, and/or 116, SGW 124, PGW 122, Gi-LAN service 128, ePDG 130, etc.) that may be deployed in communication system 100 depending on needs and implementations.

During operation, application service 142 can request (204) a trusted identity content token from identity manager 144 by sending a flow registration request message to identity manager 144 that includes an authorization token (auth_token) identifying the application service to the identity manager and a content type (content_type) identifier that identifies a content type associated with the application service for which the trusted identity content token is requested. In various embodiments, an authorization token and a content type identifier, respectively, can be any value, numeric or alphanumeric of any size (e.g., multibit), as agreed upon between an application service provider and a mobile service provider (e.g., which represents an established trust relationship between the application service provider and a mobile service provider) that identifies a particular application service or service type and a content type, respectively, that can be associated with the application service or service type.

At 206, identity manager 144 authenticates the application service 142 and generates a trusted identity content token based on the auth_token and the content_type included in the request. At 208, identity manager 144 responds to the request by sending a flow registration response message to application service 142 that includes the generated content token (content_token), the application service 142 stores (210) the content token. In at least one embodiment, identity manager 144 can perform policy push messaging (212) to communicate the content token to detection node 202. In other embodiments, detection node 202 can be pre-configured with different content tokens that may be used in the communication system.

In various embodiments, a content token (e.g., content_token) can be any value, numeric or alphanumeric of any size (e.g., multibit), as agreed upon between an application service provider and a mobile service provider that can identify a particular application service or service type and a particular content type associated with the application service or service type.

At some later time, UE 102 connects (220) to the 3GPP core network through connection operations based on 3GPP standards. At some later time, an application operating via UE 102 desires (222) content and requests (224a, 224b) the content from the application service via a content request message sent to the application service 142 that passes through detection node 202. Application service 142 embeds (226) the content_token in one or more packet(s) for one or more IP flow(s) for the content and sends (228a, 228b) the content to the UE 102 via one or more content response message(s) that pass through detection node 202. In various embodiments, the application service 142 can embed the content token (content_token) associated with the content flow(s) in the one or more packet(s) by tagging, appending, or otherwise including the content token in an unencrypted header for the packet(s) or in an unencrypted trailer, sometimes referred to as a 'footer' for the packet(s). The content token (content_token) associated with the particular content type for the particular application service can be included in subsequent content sent from the application service 142 to the UE 102.

In various embodiments, application service 142 can embed content tokens in every packet associated with flow(s) or can embed content tokens in one or more packet(s) associated with flow(s). For example, in some cases a data-packet processing node may only be interested in determining whether a particular flow associated with a particular content type has been initiated (e.g., as opposed to tracking a number of packets, bytes, etc. have been transferred for a particular content type. In such cases, application service 142 may determine to embed content tokens in packet(s) when a flow is started and/or at various times during the lifetime of a flow (e.g., to indicate to a packet processing node that a flow is active).

In at least one embodiment, detection node 202 can detect (230) the content_token in the packet(s) for the content flow, which can trigger additional operation(s) (e.g., validating the flow, assigning a charging rule to the flow, etc.) associated with the content_token to be performed by detection node 202. In various embodiments, different operations associated with different content tokens that may be present for one or more UE IP flow(s) can be provisioned for a detection node by a mobile service provider based on various needs and implementations.

Figure 3B:
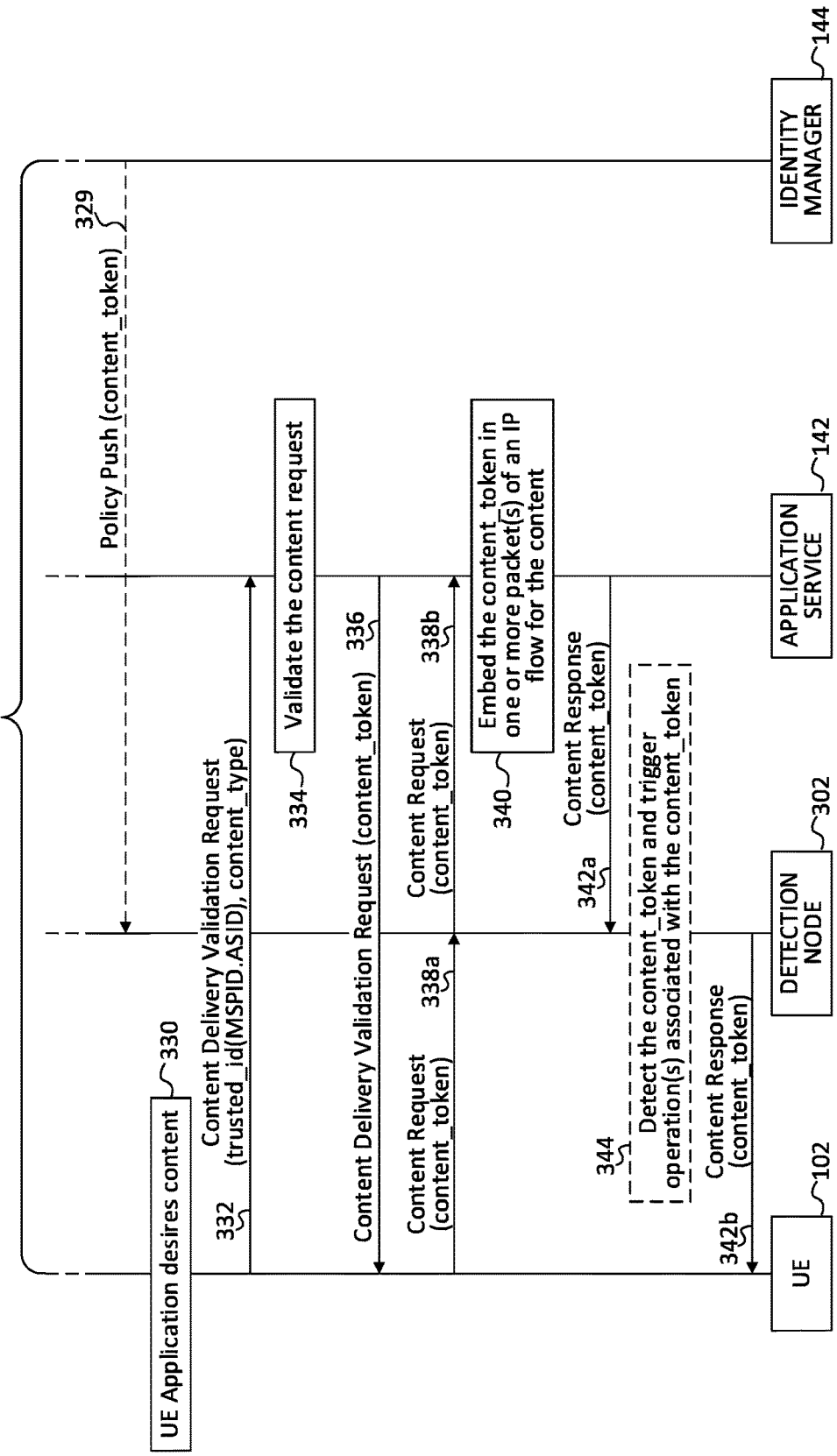

Turning to FIGS. 3A-3B, FIGS. 3A-3B are a simplified interaction diagram 300 illustrating example details that can be associated with providing flow identification in accordance with one potential embodiment. In particular, the embodiment of FIGS. 3A-3B illustrates example details that can be associated with interactions and operations that can be performed within communication system 100 involving subscriber dependent trusted identity content token generation. The embodiment of FIGS. 3A-3B includes UE 102, a given detection node 302, a given application service 142, and identity manager 144. In various embodiments, detection node 302 can represent any data-plane packet processing node (e.g., any RF node 112, 114, and/or 116, SGW 124, PGW 122, Gi-LAN service 128, ePDG 130, etc.) that may be deployed in communication system 100 depending on needs and implementations.

At 304, UE 102 connects to the 3GPP core network through connection operations based on 3GPP standards. At some later time, an application operating on UE 102 desires (306) an association with application service 142 and causes UE 102 to request (308) a trusted identity (ID) associated with the application service 142 by sending a trusted ID request message to the identity manager 144. At 310, identity manager 144 generates a trusted ID, referred to herein as a mobile service provider ID (MSPID), that identifies the mobile service provider associated with the identity manager 144. The trust relationship established between the application service(s) 142 and the identity manager 144 can be extended to the UE for communications between the UE and the application service(s) via 3GPP core network 120. At 312, the identity manager sends a trusted ID request message to the application service 142 that includes the MSPID. At 314, the application service 142 generates a trusted ID (MSPID.ASID) that includes the MSPID and an application service identifier (ASID) that identifies the application service 142.

In various embodiments, an MSPID can be any value, numeric or alphanumeric of any size (e.g., multibit), as agreed upon between an application service provider and a mobile service provider that identifies a particular mobile service provider (MSP). In various embodiments, an ASID can be any value, numeric or alphanumeric of any size (e.g., multibit), as agreed upon between an application service provider and a mobile service provider that identifies a particular application service or service type.

At 316, the application service 142 sends a trusted ID response message to the identity manager 144 that includes the trusted ID (trusted_id(MSPID.ASID)). At 318, the identity manager 144 sends a trusted ID response message to the UE 102 that includes the trusted ID (trusted_id(MSPID.ASID)). In some embodiments, identity manager can combine trusted IDs from multiple application services into a trusted ID list that can be sent to a UE. At 320, the UE 102 stores any trusted ID(s) received from the identity manager 144.

At 322, application service 142 can request a trusted identity content token from identity manager 144 by sending a flow registration request message to identity manager 144 that includes an authorization token (auth_token) identifying the application service to the identity manager and a content type (content_type) identifier that identifies a content type associated with the application service for which the trusted identity content token is requested. At 324, identity manager 144 authenticates the application service 142 and generates a trusted identity content token based on the auth_token and the content_type included in the request. At 326, identity manager 144 responds to the request by sending a flow registration response message to application service 142 that includes the generated content token (content_token), the application service 142 stores (328) the content token.

In at least one embodiment, as shown in FIG. 3B, identity manager 144 can perform policy push messaging (329) to communicate the content token to detection node 302. In other embodiments, detection node 202 can be pre-configured with different content tokens that may be used in the communication system. As shown in FIG. 3B, at some later time an application operating on UE 102 desires (330) content associated with application service 142, which triggers UE 102 to send (332) a content delivery validation request message to application service 142 that includes the trusted ID (MSPID.ASID) and the content_type identifier that identifies the content type associated with the application that is being requested by the UE application. At 334, application service 142 validates that the content request prior to sending the content to the UE based, at least in part on the MSPID.ASID. The validation performed at 334 provides a mechanism to communicate the content token to the UE 102. By identifying the trusted ID received in the content delivery validation request, application service 142 can validate that the content request is being sent from a trusted source. Thus, in at least one embodiment, information in addition to the trusted ID such as, for example, IMSI or other UE identifier may not be included in the content request. However, in some embodiments, information in addition to a trusted ID may be included in content delivery validation request messaging.

Based on a successful validation, the application service sends (336) a content delivery validation response message to the UE that includes the content token (content_token) associated with the content type of the application service 142.

Upon receiving the content token (content_token) associated with the content type desired from the application service, the UE 102 requests (338a, 338b) the content from the application service via a content request message including the content token (content_token) sent to the application service 142 that passes through detection node 302. Application service 142 embeds (340) the content_token in one or more packet(s) of an IP flow for the content and sends (342a, 342b) the content to the UE 102 via one or more content response message(s) that pass through detection node 302. The application service 142 can embed the content_token in the one or more packet(s) by tagging, appending, or otherwise including the content_token in an unencrypted header for the packet(s) or in an unencrypted trailer for the packet(s). The content token (content_token) associated with the particular content type for the particular application service can be included in subsequent content sent from the application service 142 to the UE 102.

In at least one embodiment, detection node 302 can detect (344) the content_token in the packet(s) for the content flow, which can trigger additional operation(s) (e.g., validating the flow, assigning a charging rule to the flow, etc.) associated with the content_token to be performed by detection node 302. In various embodiments, different operations associated with different content tokens that may be present for one or more UE IP flow(s) can be provisioned for a detection node by a mobile service provider based on various needs and implementations.

Figure 4:
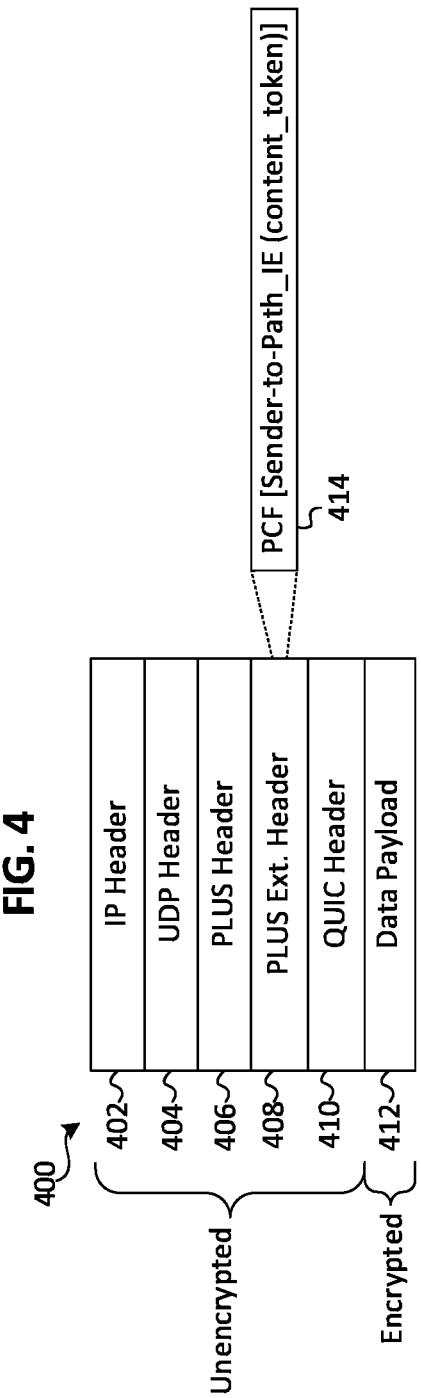
FIG. 4 is a simplified schematic diagram illustrating example details that can be associated with an example packet that includes a content token in accordance with one potential embodiment.

Referring to FIG. 4, FIG. 4 is a simplified schematic diagram illustrating example details that can be associated with an example packet 400 that includes a content token in accordance with one potential embodiment. Packet 400 can include an IP header 402, a UDP header 404, a Path Layer UDP Substrate (PLUS) header 406, a PLUS Extended (Ext.) header 408, a Quick UDP Internet Connection (QUIC) protocol header 410, and a data payload 412. The IP header 402, UDP header 404, PLUS header 406, PLUS Ext. header 408, and QUIC header 410, are carried unencrypted in packet 400, while the data payload 412 can be encrypted for the packet.

The IP header 402 can include various source address information, destination address information, version information, etc. as may be provisioned for IP version 4 (IPv4) or IP version 6 (IPv6) formatted packets.

The UDP header 404 can include UDP source and destination port information, length information, and a checksum. The PLUS header 406 can include a unique PLUS identifier, a connection/association token (CAT), a packet serial number, a packet serial echo, and/or various flags as may be defined by the IETF. In at least one embodiment, the unique PLUS identifier can be chosen to have a value that does not overlap with any other UDP protocol value that may be carried by in a UDP-based header for a packet and can be used to identify that a PLUS header is included with the packet. An extended header bit can be set in PLUS header 406 to indicate the presence of the PLUS Ext. header 408 for packet 400.

The PLUS Ext. header 408 can be provisioned with a Path Communication Field (PCF) 414 that includes a Sender-To-Path Information Element (IE) in which a trusted identity content token can be embedded by a UE and/or application service, in accordance with various embodiments of communication system 100. The PLUS Ext. header 408 can also be provisioned with various flags, information, etc. as may be defined by the IETF. The QUIC header 410 can include various flags, a connection ID, version information, diversification nonces, and packet number information as may be defined by the IETF. The data payload 412 can carry content that is to be communicated to a UE.

It should be understood that the embodiment of FIG. 4 only provides one example packet configuration for which a content token can be embedded, unencrypted, within a packet. In some embodiments, trusted identity content tokens can be embedded in packets by tagging, appending, or otherwise including a trusted identity content token in an unencrypted trailer for packets. Virtually any other mechanisms can be used to embed content tokens in packets using similar means and methods as those described herein and, thus, are clearly within the scope of the present disclosure.

Figure 5:
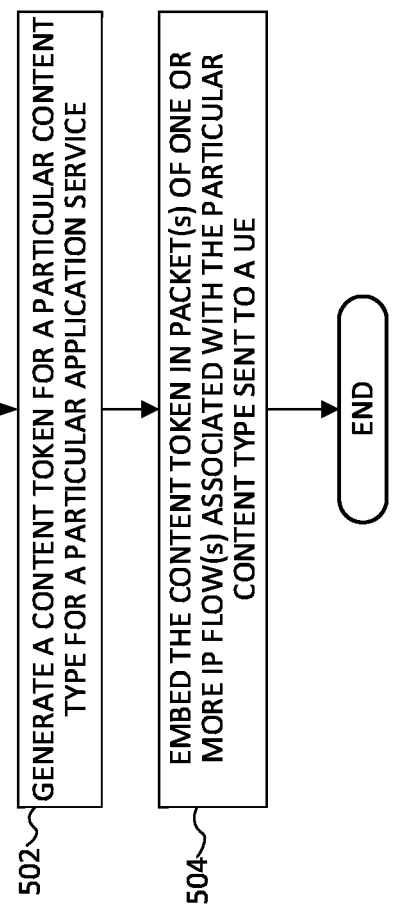
FIG. 5 is a simplified flow diagram illustrating example operations that can be associated with providing flow identification in a network environment in accordance with one potential embodiment.

Referring to FIG. 5, FIG. 5 is a simplified flow diagram illustrating example operations 500 that can be associated with providing flow identification in a network environment in accordance with one potential embodiment. Operations 500 discussed for the embodiment of FIG. 5 can be performed using any combination of identity manager 144, application service(s), 142, and/or UE 102 as discussed for various embodiments described herein.

At 502, the operations can include generating a content token for a particular content type for a particular application service. In one embodiment, the generating at 502 can be performed by identity manager 144 as discussed herein. At 504, the operations can include embedding the content token in packet(s) of one or more IP flow(s) associated with the particular content type sent to a UE (e.g., for content sent from a particular application service 142 to UE 102). Other operations can be performed as discussed for various embodiments described herein.

Figure 6:
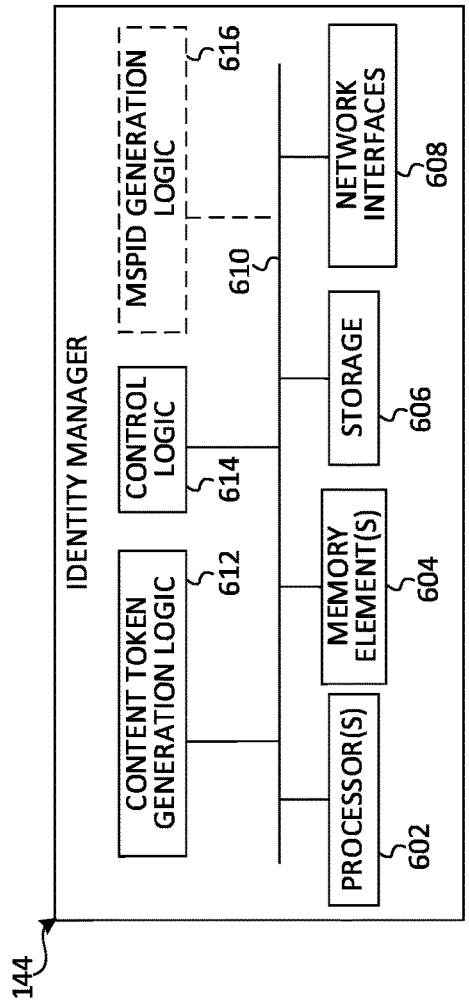
FIGS. 6-9 are simplified block diagrams illustrating example details that can be associated with various example embodiments.

Referring to FIG. 6, FIG. 6 is a simplified block diagram illustrating example details that can be associated with identity manager 144 in accordance with one potential embodiment. In at least one embodiment, identity manager 144 can include one or more processor(s) 602, one or more memory element(s) 604, storage 606, network interfaces 608, a bus 610, content token generation logic 612, and control logic 614. In at least one embodiment, identity manager 144 can further include MSPID generation logic 616. In various embodiments, instructions associated with logic provisioned for identity manager 144 can overlap in any manner and are not limited to the specific allocation of instructions and/or operations described herein.

In at least one embodiment, processor(s) 602 is/are at least one hardware processor configured to execute various tasks, operations and/or functions for identity manager 144 as described herein according to software and/or instructions configured for identity manager 144. In at least one embodiment, memory element(s) 604 and/or storage 606 is/are configured to store data, information, software, and/or instructions associated with identity manager 144, and/or logic configured for memory element(s) 604 and/or storage 606 (e.g., any logic can, in various embodiments, be stored using any combination of memory element(s) 604 and/or storage 606). In at least one embodiment, bus 610 can be configured as an interface that enables one or more elements of identity manager 144 to communicate in order to exchange information and/or data. In at least one embodiment, bus 610 may be implemented as a fast kernel-hosted interconnect, potentially using shared memory between processes (e.g., logic, etc.), which can enable efficient communication paths between the processes.

In various embodiments, network interfaces 608 enable communication between identity manager 144, and other network elements, systems, etc. that may be present in communication system 100 to facilitate operations discussed for various embodiments described herein. In some embodiments, network interfaces 608 can include one or more Ethernet driver(s) and/or controller(s), Fibre Channel driver(s) and/or controller(s), or other similar network interface driver(s) and/or controller(s) to enable communications for identity manager within communication system 100. Note that in some embodiments, storage can be consolidated with memory elements (or vice versa), or can overlap/exist in any other suitable manner.

In at least one embodiment, content token generation logic 612 can include instructions that, when executed (e.g., by one or more processor(s) 602), cause identity manager 144 to generate a trusted identity content token for either subscriber independent or subscriber dependent operations as discussed herein for particular content associated with a particular application service.

In various embodiments, control logic 614 can include instructions that, when executed, cause identity manager 144 to perform operations, which can include, but not be limited to, providing overall control operations of identity manager 144; cooperating with MSPID generation logic 616 (if provisioned); interacting with other elements, systems, etc. of communication system 100; maintaining and/or interacting with stored data, information, parameters, etc. (e.g., memory element(s), storage, data structures, databases, tables, etc.); combinations thereof; and/or the like to facilitate various operations as discussed for various embodiments described herein.

In at least one embodiment (e.g., for operations associated with subscriber dependent content token generation), MSPID generation logic 616 can include instructions that, when executed, cause identity manager to generate a trusted mobile service provider identity (MSPID) that can be used to identify to a UE one or more application service(s) 142 for which a trust relationship has been established between the identity manager 144 and the application service(s) 142.

Figure 7:
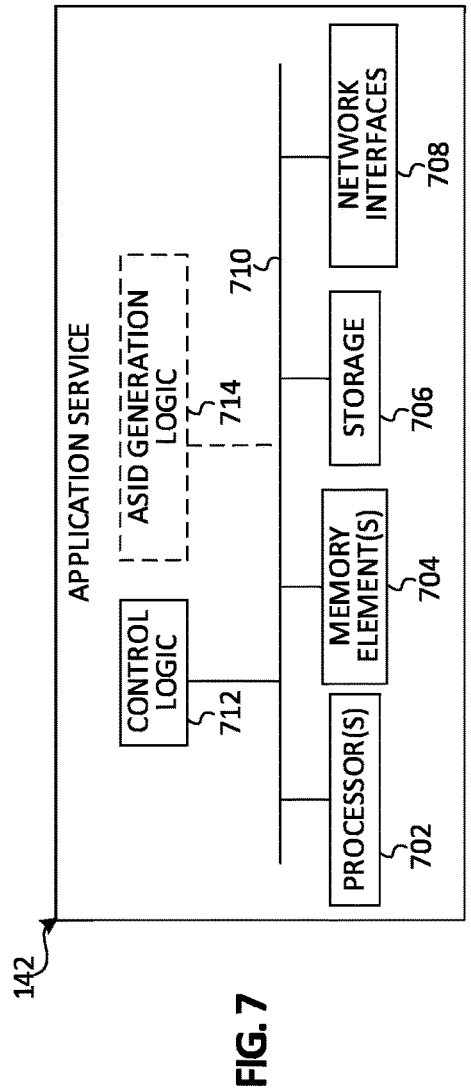

Referring to FIG. 7, FIG. 7 is a simplified block diagram illustrating example details that can be associated with an example application service 142 in accordance with one potential embodiment. In at least one embodiment, application service 142 can include one or more processor(s) 702, one or more memory element(s) 704, storage 706, network interfaces 708, a bus 710, and control logic 712. In at least one embodiment, application service 142 can further include ASID generation logic 714. It should be understood that the example details illustrated for the embodiment of FIG. 7 can be associated with any application service that may be deployed in communication system 100. In various embodiments, instructions associated with logic provisioned for application service 142 can overlap in any manner and are not limited to the specific allocation of instructions and/or operations described herein.

In at least one embodiment, processor(s) 702 is/are at least one hardware processor configured to execute various tasks, operations and/or functions for application service 142 as described herein according to software and/or instructions configured for application service 142. In at least one embodiment, memory element(s) 704 and/or storage 706 is/are configured to store data, information, software, and/or instructions associated with application service 142, and/or logic configured for memory element(s) 704 and/or storage 706 (e.g., any logic can, in various embodiments, be stored using any combination of memory element(s) 704 and/or storage 706). In at least one embodiment, bus 710 can be configured as an interface that enables one or more elements of application service 142 to communicate in order to exchange information and/or data. In at least one embodiment, bus 710 may be implemented as a fast kernel-hosted interconnect, potentially using shared memory between processes (e.g., logic, etc.), which can enable efficient communication paths between the processes.

In various embodiments, network interfaces 708 enable communication between application service 142, and other network elements, systems, etc. that may be present in communication system 100 to facilitate operations discussed for various embodiments described herein. In some embodiments, network interfaces 708 can include one or more Ethernet driver(s) and/or controller(s), Fibre Channel driver(s) and/or controller(s), or other similar network interface driver(s) and/or controller(s) to enable communications for application service 142 within communication system 100. Note that in some embodiments, storage can be consolidated with memory elements (or vice versa), or can overlap/exist in any other suitable manner.

In various embodiments, control logic 712 can include instructions that, when executed (e.g., by one or more processor(s) 702), cause application service 142 to perform operations, which can include, but not be limited to, providing overall control operations of application service 142; cooperating with ASID generation logic 714 (if provisioned) to perform various operations; interacting with other elements, systems, etc. of communication system 100; maintaining and/or interacting with stored data, information, parameters, etc. (e.g., memory element(s), storage, data structures, databases, tables, etc.); combinations thereof; and/or the like to facilitate various operations as discussed for various embodiments described herein.

In at least one embodiment (e.g., for operations associated with subscriber dependent content token generation), ASID generation logic 714 can include instructions that, when executed, cause application service 142 to generate a trusted application service identity (ASID) that can be used to identify to the application service 142 to a UE such that a trust relationship has been established between the identity manager 144 and the application service 142.

Figure 8:
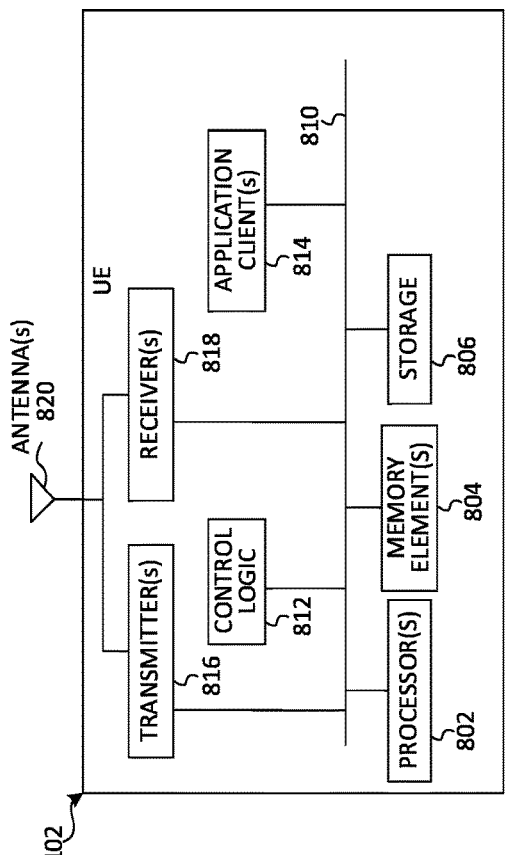

Referring to FIG. 8, FIG. 8 is a simplified block diagram illustrating example details that can be associated with UE 102 in accordance with one potential embodiment. In at least one embodiment, UE 102 can include one or more processor(s) 802, one or more memory element(s) 804, storage 806, a bus 810, control logic 812, one or more application client(s) 814, one or more transmitter(s) 816, one or more receiver(s) 818, and one or more antenna(s) 820. It should be understood that the example details illustrated for the embodiment of FIG. 8 can be associated with any UE that may be present in communication system 100. In various embodiments, instructions associated with logic provisioned for UE 102 can overlap in any manner and are not limited to the specific allocation of instructions and/or operations described herein.

In at least one embodiment, processor(s) 802 is/are at least one hardware processor configured to execute various tasks, operations and/or functions for UE 102 as described herein according to software and/or instructions configured for UE 102. In at least one embodiment, memory element(s) 804 and/or storage 806 is/are configured to store data, information, software, and/or instructions associated with UE 102, and/or logic configured for memory element(s) 804 and/or storage 806 (e.g., any logic, clients, etc. can, in various embodiments, be stored using any combination of memory element(s) 804 and/or storage 806). In at least one embodiment, bus 810 can be configured as an interface that enables one or more elements of UE 102 to communicate in order to exchange information and/or data. In at least one embodiment, bus 810 may be implemented as a fast kernel-hosted interconnect, potentially using shared memory between processes (e.g., logic, etc.), which can enable efficient communication paths between the processes.

In various embodiments, control logic 812 can include instructions that, when executed (e.g., by one or more processor(s) 802), cause UE 102 to perform operations, which can include, but not be limited to, providing overall control operations of UE 102; interacting with RF nodes, elements, systems, application service(s), etc. of communication system 100; cooperating with one or more application client(s) 814 to perform various operations; maintaining and/or interacting with stored data, information, parameters, etc. (e.g., memory element(s), storage, data structures, databases, tables, etc.); combinations thereof; and/or the like to facilitate various operations as discussed for various embodiments described herein.

In at least one embodiment, application client(s) 814 can include software, instructions, logic, combinations thereof, or the like which can facilitate interactions (e.g., messaging, signaling, etc.) with one or more application service(s) 142. During operation in some embodiments, an application service 142 can cause an application client 814 to be installed or otherwise provisioned for UE 102 to enable interactions between the UE, the application service 142 and/or identity manager 144 (e.g., trusted ID requests, content requests, etc.) according to APIs, protocols, interfaces, etc. that can facilitate communications between the UE 102, the application service 142, and/or the identity manager 144 and/or any application-specific operations that may be performed by the UE 102.

One or more transmitter(s) 816, one or more receiver(s) 818, and one or more antenna(s) 820 can be provisioned for UE 102 to enable OTA RF communications with one or more RF node(s) (e.g., 3GPP and/or non-3GPP RF nodes).

Figure 9:
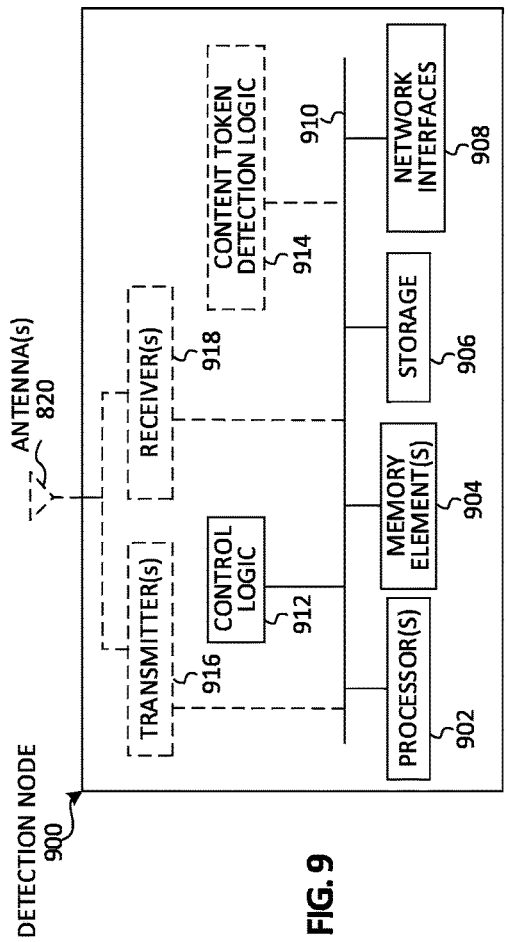

Referring to FIG. 9, FIG. 9 is a simplified block diagram illustrating example details that can be associated with an example detection node 900 in accordance with one potential embodiment. In at least one embodiment, detection node 900 can include one or more processor(s) 902, one or more memory element(s) 904, storage 906, a bus 910, and control logic 912. In at least one embodiment, detection node 900 can be provisioned with content token detection logic 914. In at least one embodiment, detection node 900 can also be provisioned with one or more transmitter(s) 916, one or more receiver(s) 918, and one or more antenna(s) 920. It should be understood that the example details illustrated for the embodiment of FIG. 9 can be associated with any data-plane processing node through which an IP flow associated with one or more application service(s) may flow between a UE and one or more application service(s). For example, in various embodiments, detection node 900 can represent any of 3GPP RF node 112, non-3GPP RF node 114 and/or 116, PGW 122, SGW 124, Gi-LAN service(s) 128, ePDG 130, and/or any other data-plane processing nodes, elements, systems, or the like that may be provisioned for communication system 100. In various embodiments, instructions associated with logic provisioned for detection node 900 can overlap in any manner and are not limited to the specific allocation of instructions and/or operations described herein.

In at least one embodiment, processor(s) 902 is/are at least one hardware processor configured to execute various tasks, operations and/or functions for detection node 900 as described herein according to software and/or instructions configured for detection node 900. In at least one embodiment, memory element(s) 904 and/or storage 906 is/are configured to store data, information, software, and/or instructions associated with detection node 900, and/or logic configured for memory element(s) 904 and/or storage 906 (e.g., any logic can, in various embodiments, be stored using any combination of memory element(s) 904 and/or storage 906). In at least one embodiment, bus 910 can be configured as an interface that enables one or more elements of detection node 900 to communicate in order to exchange information and/or data. In at least one embodiment, bus 910 may be implemented as a fast kernel-hosted interconnect, potentially using shared memory between processes (e.g., logic, etc.), which can enable efficient communication paths between the processes.

In various embodiments, control logic 912 can include instructions that, when executed (e.g., by one or more processor(s) 902), cause detection node 900 to perform operations, which can include, but not be limited to, providing overall control operations of detection node 900; cooperating with content token detection logic 914 (if provisioned) to perform various operations; interacting with UE, elements, systems, application service(s), etc. of communication system 100; maintaining and/or interacting with stored data, information, parameters, etc. (e.g., memory element(s), storage, data structures, databases, tables, etc.); combinations thereof; and/or the like to facilitate various operations as discussed for various embodiments described herein.

In at least one embodiment, content token detection logic 914 can include instructions that, when executed, cause detection node to inspect one or more packet(s) for a content token that may trigger one or more additional operations (e.g., validating a flow, assigning or installing a charging rule, applying charging based on a charging rule, etc.) to be performed by the detection node 900.

In various embodiments, one or more transmitter(s) 916, one or more receiver(s) 918, and one or more antenna(s) 820 can be provisioned for detection node 900 to enable OTA RF communications with one or more UE that may be present in communication system 100.

Variations and Implementations

In various embodiments, a UE (e.g., UE 102 and/or any other UE that may be present in communication system 100) can be inclusive of a device used to initiate and/or respond to communications (e.g., Requests/Responses, etc.) in a network, such as a computer, an electronic device such as an Internet of Things (IoT) device (e.g., an appliance, a thermostat, a sensor, a home automation controller, a voice activated device, a parking meter, etc.), a personal digital assistant (PDA), a laptop or electronic notebook, a gaming system, a vehicle infotainment system, a home entertainment electronic device (e.g., a smart television, digital recording device, speaker, etc.), a cellular telephone, an IP phone, an electronic device having cellular and/or Wi-Fi connection capabilities, a wearable electronic device or any other device, component, element, or object capable of initiating voice, audio, video, media, or data exchanges within communication system 100. A UE may also be inclusive of a suitable interface to a human user such as a microphone, a display, a keyboard, or other terminal equipment. In some embodiments, UE can be classified as static (e.g., unmoving or moving with relatively low frequency) such as a television, desktop computer, thermostat, etc. or mobile (e.g., moving or moving with relatively high frequency such as a mobile phone, wearable electronic device, laptop, etc.

A UE may also be any device that seeks to initiate a communication on behalf of another entity or element such as a program, application, a database, or any other component, device, element, or object capable of initiating an exchange within communication system 100. In at least some embodiments, a UE can be associated with users that communicate in communication system 100. In other embodiments, UE may facilitate data exchanges while operating independently of user interactions. Within communication system 100, IP addresses, if used, can be assigned using Dynamic Host Configuration Protocol (DHCP), Stateless Address Auto-configuration (SLAAC), or any suitable variation thereof. IP addresses, if used within communication system 100, can include IPv4 and/or IPv6.

In various embodiments, a subscriber associated with a given UE and/or the UE itself can be identified using one or more identifiers such as, for example, an International Mobile Subscriber Identity (IMSI), a Temporary IMSI (T-IMSI), a Serving Temporary Mobile Subscriber Identity (S-TMSI), a Globally Unique Temporary UE Identity (GUTI) or a Mobile Station International Subscriber Directory Number (MSISDN).

3GPP RF node 112 may provide a 3GPP-based communications interface between UE 102 and 3GPP core network 120 via one or more 3GPP Radio Access Type(s) (RAT(s)). In various embodiments, 3GPP RAT types may include accesses such as a Global System for Mobile Communications (GSM), General Packet Radio Services (GPRS), Enhanced Data Rates for GSM (EDGE) radio access network (GERAN), generally referred to as a 2nd Generation (2G) access network; a Universal Mobile Telecommunications System (UMTS) Terrestrial radio access network (UTRAN), High Speed Packet Access (HSPA/HSPA+), generally referred to as a 3rd Generation (3G) access network; and/or a E-UTRAN, which can include a 4G, LTE/LTE-Advanced (LTE-A)/LTE-Advanced Pro and/or 5G New Radio (NR) access network. In various embodiments, any 3GPP RF node (e.g., 3GPP RF node 112) deployed in communication system 100 can be configured as an evolved Node B (eNodeB or eNB), a Home eNode B (HeNB), a Node B (NodeB), a Home NodeB (HNB), a Base Station System (BSS) combinations thereof, or any other 3GPP RF node as may be defined by 3GPP standards.

In various embodiments, 3GPP RF node 112, non-3GPP RF node 114 (if implemented), and/or non-3GPP RF node 116 (if implemented) can be configured with one or more transmitter(s), receiver(s), processor(s), controller(s), memory element(s), storage, etc. to facilitate OTA RF communications (e.g., Wi-Fi, 4G, 5G, etc.) between UE 102 and a given RF node.

If implemented, non-3GPP RF nodes 114 and/or 116 can provide non-3GPP-based communication interfaces between UE 102 and 3GPP core network 120 via one or more non-3GPP RAT(s). In various embodiments, non-3GPP RAT types may include accesses such IEEE 802.11 (e.g., Wi-Fi), IEEE 802.16 (e.g., Worldwide Interoperability for Microwave Access (WiMAX)), Radio-frequency Identification (RFID), Near Field Communication (NFC), Bluetooth™ millimeter wave (mm.wave), combinations thereof, or the like as may be defined by IETF, ETSI, IEEE, Wi-Fi Alliance® standards, combinations thereof, or the like.

If implemented, non-3GPP RF node 114 can represent a communication node for an untrusted non-3GPP access network (e.g., untrusted Wi-Fi) and can interface with ePDG 130, which may interface with PGW 122. If implemented, non-3GPP RF node 116 can represent a communication node for a trusted 3GPP access network (e.g., trusted Wi-Fi) and can interface directly with PGW 122. In general, trusted non-3GPP access networks support mobility, policy, and Authentication, Authorization and Accounting (AAA) interfaces to a 3GPP core network, whereas untrusted non-3GPP access networks do not. For a trusted non-3GPP access network, a viable relationship exists between a service provider and the core network. In contrast, access from an untrusted non-3GPP access network is managed via the ePDG, which provides for Internet Protocol Security (IPsec) security associations to UE via the untrusted non-3GPP access network.

In various embodiments, MME 126 can provide tracking area list management, idle mode UE tracking, bearer activation and deactivation, SGW and PGW selection for UEs and authentication services. In at least one embodiment, MME 126 may be in communication with a Home Subscriber Server (not shown), which may include one or more databases containing user-related and subscription-related information. In various embodiments, SGW 124 may route and forward user data-plane packets (e.g., IP flows), may act as a mobility anchor for the data-plane during inter-eNodeB handovers, and may also act as an anchor for mobility between LTE and other 3GPP technologies. In various embodiments, PGW 122 may provide IP connectivity access network (IP-CAN) session connectivity from a given UE (e.g., UE 102) to external packet data network(s) 140 by being the point of exit and entry of IP flows for the UE with external networks. In general, Gi-LAN service(s) 128, if provisioned, can include DPI, firewalling, Network Address (and possibly Port) Translation (NA(P)T), Over-the-Top (OTT) services, combinations thereof, or the like.

In various embodiments, 3GPP core network 120 can include various additional elements and/or nodes as may be defined by 3GPP standards including, but not limited to: Authentication, Authorization and Accounting (AAA) elements, Policy and Charging Rules Functions (PCRFs), Mobile Switching Centers (MSCs), Traffic Detection Functions (TDFs), Serving GPRS Support Nodes (SGSNs), Gateway GPRS Support Nodes (GGSNs), combinations thereof, and/or any other network elements as may be defined by 3GPP standards to facilitate the exchange of data to and from one or more PDNs for one or more UEs. These network elements are also not shown in order to illustrate other features of communication system 100. In various embodiments, one or more PDN(s) 150 can include the Internet, an IP Multimedia Subsystem (IMS), an enterprise network, operator IP services, combinations thereof, or the like.

Communications in a network environment can be referred to as 'messages', 'messaging', 'signaling', and/or variations thereof which may be inclusive of packets. As discussed herein in this Specification, a packet is a formatted unit of information that can contain control information (e.g., source and destination address, etc.) with or without data, which is also known as payload. In some embodiments, control information can be included in headers and trailers for packets or frames. Packets can be sent and received according to any suitable communication protocols. Suitable communication protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information, or any type of source or object code, or any other suitable data or information in any appropriate format that can be communicated from one point to another in electronic devices and/or networks. Additionally, signaling, frames, messages, requests, responses, replies, queries, etc. are forms of network traffic and, therefore, may comprise one or more packets.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Extensible Messaging and Presence Protocol (XMPP), Simple Object Access Protocol (SOAP), SOAP over Hypertext Transfer Protocol (HTTP), Representational State Transfer (REST), combinations thereof, or the like. In some embodiments, secure communications can be facilitated using TCP/IP Secure Sockets Layer (SSL) communications.

Communication system 100 can include one or more networks, such as RAN 110, 3GPP core network 120, and/or one or more packet data network(s) 140, which can represent a series of points or network elements of interconnected communication paths for receiving and transmitting messages (e.g., packets of information) that propagate through the one or more networks. These network elements offer communicative interfaces that facilitate communications between the network elements. A network can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), Low Power Network (LPN), Low Power Wide Area Network (LPWAN), Machine to Machine (M2M) network, IoT network, any other appropriate architecture or system that facilitates communications in a network environment, combinations thereof, or any suitable combination thereof.

Networks through which communications propagate in communication system 100 can use any suitable technologies for communication including wireless (e.g., 3G/4G/5G/nG, IEEE 802.11 (e.g., Wi-Fi), IEEE 802.16 (e.g., Worldwide Interoperability for Microwave Access (WiMAX)), Radio-frequency Identification (RFID), Near Field Communication (NFC), Bluetooth™, mm.wave, etc.), and/or wired (e.g., T1 lines, T3 lines, digital subscriber lines (DSL), Ethernet, Fibre Channel, etc.) communication. Generally, any suitable means of communication may be used such as electric, sound, light, infrared, and/or radio.

In regards to the internal structure associated with communication system 100, appropriate software, hardware, and/or algorithms are being provisioned for UE 102, RF node(s) (e.g., any combination of 3GPP RF node 112, non-3GPP RF node 114 and/or non-3GPP RF node 116), detection nodes (e.g., any RF node, PGW 122, SGW 124, Gi-LAN service(s) 128, ePDG 130, and/or any other data-plane processing nodes), identity manager 144, and application service(s) 142 within communication system 100 in order to facilitate flow identification operations in a network environment in accordance with the teachings of the present disclosure.

In various example implementations, UE 102, RF node(s) (e.g., any combination of 3GPP RF node 112, non-3GPP RF node 114 and/or non-3GPP RF node 116), detection nodes (e.g., any RF node, PGW 122, SGW 124, Gi-LAN service(s) 128, ePDG 130, and/or any other data-plane processing nodes), identity manager 144, and/or application service(s) 142 discussed for various embodiments described herein can encompass network elements such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various flow identification operations in a network environment (e.g., for networks such as those illustrated in FIG. 1) as described for various embodiments discussed herein. In various embodiments, one or more of the UE 102, RF node(s) (e.g., any combination of 3GPP RF node 112, non-3GPP RF node 114 and/or non-3GPP RF node 116), detection nodes (e.g., any RF node, PGW 122, SGW 124, Gi-LAN service(s) 128, ePDG 130, and/or any other data-plane processing nodes), identity manager 144, and/or application service(s) 142 can include software (or reciprocating software) that can coordinate in order to achieve operations associated with providing flow identification in a network environment using trusted identity content tokens as discussed herein and may include any suitable algorithms, hardware, software, components, modules, logic, clients, interfaces, and/or objects that facilitate the operations thereof. This may be inclusive of appropriate algorithms, communication protocols, interfaces, and/or standards, proprietary and/or non-proprietary, that allow for the effective exchange of data or information.

In various embodiments, UE 102, RF node(s) (e.g., any combination of 3GPP RF node 112, non-3GPP RF node 114 and/or non-3GPP RF node 116), detection nodes (e.g., any RF node, PGW 122, SGW 124, Gi-LAN service(s) 128, ePDG 130, and/or any other data-plane processing nodes), identity manager 144, and application service(s) 142 as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of UE 102, RF node(s) (e.g., any combination of 3GPP RF node 112, non-3GPP RF node 114 and/or non-3GPP RF node 116), detection nodes (e.g., any RF node, PGW 122, SGW 124, Gi-LAN service(s) 128, ePDG 130, and/or any other data-plane processing nodes), identity manager 144, and/or application service(s) 142 discussed herein could be provided in any database, table, register, control list, cache, storage and/or storage structure: all of which can be referenced at any suitable timeframe. Any such storage options may also be included within the broad term 'memory element' as used herein. Any of potential processing elements, controllers, systems, managers, logic, and/or machines described herein can be construed as being encompassed within the broad term 'processor'. In various embodiments, UE 102, RF node(s) (e.g., any combination of 3GPP RF node 112, non-3GPP RF node 114 and/or non-3GPP RF node 116), detection nodes (e.g., any RF node, PGW 122, SGW 124, Gi-LAN service(s) 128, ePDG 130, and/or any other data-plane processing nodes), identity manager 144, and/or application service(s) 142 discussed herein can also include suitable interfaces for receiving, transmitting, and/or otherwise communicating data or information in a network environment.

Note that in certain example implementations, operations as outlined herein to facilitate flow identification in a network environment using trusted identity content tokens may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage can store data, software, code, instructions (e.g., processor instructions), logic, parameters, combinations thereof, or the like used for operations described herein. This includes memory elements and/or storage being able to store data, software, code, instructions (e.g., processor instructions), logic, parameters, combinations thereof, or the like that are executed to carry out operations in accordance with teachings of the present disclosure.

A processor (e.g., a hardware processor) can execute any type of instructions associated with data to achieve the operations detailed herein. In one example, a processor can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements described herein could be some type of a programmable processor, programmable digital logic (e.g., a field programmable gate array (FPGA), a DSP processor, an EPROM, a controller, an electrically erasable PROM (EEPROM), or an ASIC) that includes digital logic, software, code, electronic instructions, or any suitable combination thereof.

One or more advantages mentioned herein do not in any way suggest that any one of the embodiments described herein necessarily provides all the described advantages or that all the embodiments of the present disclosure necessarily provide any one of the described advantages. Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a server, a computer, processor, machine, compute node, combinations thereof, or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-implemented method to facilitate flow identification in a network environment, the computer-implemented method comprising:
   communicating a registration request from a particular application service, provided by an application service provider, to an identity manager, whereupon the identity manager generates, for a particular content type of the particular application service, a content token based on a trust relationship established between the application service provider and a mobile service provider;
   receiving, by the particular application service, the content token from the identity manager; and
   embedding, by the particular application service when executed by one or more computer processors, the content token in one or more packets of a plurality of packets sent to a user equipment (UE) for one or more Internet Protocol (IP) flows associated with the particular content type, wherein the content token is embedded in an unencrypted portion of each packet that is separate from an encrypted data payload portion of each packet, whereafter based on the embedded content token, the one or more packets are forwarded with a reduced processing overhead relative to deep packet inspection being performed on the one or more packets.

2. The computer-implemented method of claim 1, wherein the registration request comprises an authorization token that identifies the trust relationship between the particular application service and the identity manager.

3. The computer-implemented method of claim 1, wherein the identity manager and the particular application service are provisioned external to a 3rd Generation Partnership Project (3GPP) core network.

4. The computer-implemented method of claim 1, further comprising:
   receiving, by the identity manager, a request from the UE for a trust identifier (ID) for the UE that are associable with the particular application service;
   generating the trust ID by the identity manager;
   communicating the trust ID to the particular application service;
   appending the trust ID with an application ID associated with the particular application service; and
   communicating, to the UE, at least one of:
      the trust ID and the application ID associated with the particular application service; and
      one or more other trust IDs and other application IDs associated with one or more other application services.

5. The computer-implemented method of claim 4, further comprising:
   receiving, by the particular application service, a content validation request from the UE associated with the particular content type, wherein the content validation request comprises the trust ID, the application ID, and an identifier that identifies the particular content type;
   determining by the particular application service whether the UE is authorized to receive the particular content type based on the trust ID and the application ID; and
   communicating the content token to the UE based on a determination that the UE is authorized to receive the particular content type.

6. The computer-implemented method of claim 1, further comprising at least one of:
   provisioning a data-plane packet processing node with the content token by communicating to the data-plane packet processing node a policy push message that comprises the content token; and
   configuring a data-plane packet processing node with the content token by the mobile service provider.

7. The computer-implemented method of claim 1, wherein the content token is a globally unique value in relation to one or more other content tokens that are generable for one or more other application services and one or more other content types.

8. One or more non-transitory tangible media encoding logic that includes instructions of a particular application service provided by an application service provider, the instructions executable to perform an operation to facilitate flow identification in a network environment, the operation comprising:
   communicating a registration request from a particular application service, provided by an application service provider, to an identity manager, whereupon the identity manager generates, for a particular content type of the particular application service, a content token based on a trust relationship established between the application service provider and a mobile service provider;
   receiving, by the particular application service, the content token from the identity manager; and
   embedding, by the particular application service when executed by one or more computer processors, the content token in one or more packets of a plurality of packets sent to a user equipment (UE) for one or more Internet Protocol (IP) flows associated with the particular content type, wherein the content token is embedded in an unencrypted portion of each packet that is separate from an encrypted data payload portion of each packet, whereafter based on the embedded content token, the one or more packets are forwarded with a reduced processing overhead relative to deep packet inspection being performed on the one or more packets.

9. The one or more non-transitory tangible media of claim 8, wherein the registration request comprises an authorization token that identifies the trust relationship between the particular application service and the identity manager.

10. The one or more non-transitory tangible media of claim 8, wherein the operation further comprises:
    receiving, by the identity manager, a request from the UE for a trust identifier (ID) for the UE that are associable with the particular application service;
    generating the trust ID by the identity manager;
    communicating the trust ID to the particular application service;
    appending the trust ID with an application ID associated with the particular application service; and
    communicating, to the UE, at least one of:
       the trust ID and the application ID associated with the particular application service; and
       one or more other trust IDs and other application IDs associated with one or more other application services.

11. The one or more non-transitory tangible media of claim 10, wherein the operation further comprises:
    receiving, by the particular application service, a content validation request from the UE associated with the particular content type, wherein the content validation request comprises the trust ID, the application ID, and an identifier that identifies the particular content type;
    determining by the particular application service whether the UE is authorized to receive the particular content type based on the trust ID and the application ID; and
    communicating the content token to the UE based on a determination that the UE is authorized to receive the particular content type.

12. A system to facilitate flow identification in a network environment, the system comprising:
    at least one memory element for storing data; and
    at least one computer processor for executing instructions associated with the data, wherein the instructions are of a particular application service provided by an application service provider, wherein the executing causes the system to perform an operation comprising:
       communicating a registration request from a particular application service, provided by an application service provider, to an identity manager, whereupon the identity manager generates, for a particular content type of the particular application service, a content token based on a trust relationship established between the particular application service provider and a mobile service provider;

receiving, by the particular application service, the content token from the identity manager; and embedding the content token in one or more packets of a plurality of packets sent to a user equipment (UE) for one or more Internet Protocol (IP) flows associated with the particular content type, wherein the content token is embedded in an unencrypted portion of each packet that is separate from an encrypted data payload portion of each packet, whereafter based on the embedded content token, the one or more packets are forwarded with a reduced processing overhead relative to deep packet inspection being performed on the one or more packets.

13. The system of claim 12, wherein the operation further comprises:

receiving, by the identity manager, a request from the UE for a trust identifier (ID) for the UE that are associable with the particular application service;

generating the trust ID by the identity manager;

communicating the trust ID to the particular application service;

appending the trust ID with an application ID associated with the particular application service; and communicating, to the UE, each of:
   the trust ID and the application ID associated with the particular application service; and
   one or more other trust IDs and other application IDs associated with one or more other application services.

14. The system of claim 13, wherein the operation further comprises:

receiving, by the particular application service, a content validation request from the UE associated with the particular content type, wherein the content validation request comprises the trust ID, the application ID, and an identifier that identifies the particular content type;

determining by the particular application service whether the UE is authorized to receive the particular content type based on the trust ID and the application ID; and communicating the content token to the UE based on a determination that the UE is authorized to receive the particular content type.

15. The system of claim 14, wherein the one or more packets are forwarded in the network environment without deep packet inspect being performed on the one or more packets, wherein the one or more packets are forwarded by a detection node configured to perform data-plane packet processing, and wherein the operation further comprises:

receiving, by the particular application service, a content request from the UE for the particular content type, wherein the content token is included in the content request;

embedding the content token in a packet that includes content associated with the particular content type; and communicating the packet to the UE.

16. The system of claim 15, wherein the registration request comprises an authorization token that identifies the trust relationship between the particular application service and the identity manager, wherein the identity manager and the particular application service are provisioned external to a 3rd Generation Partnership Project (3GPP) core network, wherein the content token is a globally unique value in relation to one or more other content tokens that are generable for one or more other application services and one or more other content types, and wherein the operation further comprises:

provisioning a data-plane packet processing node with the content token by communicating to the data-plane packet processing node a policy push message that comprises the content token; and configuring a data-plane packet processing node with the content token by the mobile service provider.

17. The system of claim 16, wherein the detection node comprises, in respective instances, a radio frequency (RF) node, a serving gateway (SGW), a packet data network (PDN) gateway (PGW), a gateway-internet local area network (Gi-LAN) service, and an evolved PDN gateway (ePDG), and wherein the operation further comprises:

detecting, by the data-plane processing node, the content token embedded in at least one packet for at least one IP flow; and performing one or more additional operations based on the detecting, wherein the one or more additional operations comprise:
   generating application related data for the at least one IP flow for the UE;
   assigning a charging rule to the at least one IP flow for the UE; and
   applying a policy to the at least one IP flow for the UE.

18. The computer-implemented method of claim 1, wherein the mobile service provider is associated with the identity manager and not associated with the particular application service.

19. The one or more non-transitory tangible media of claim 8, wherein the mobile service provider is associated with the identity manager and not associated with the particular application service.

20. The system of claim 12, wherein the mobile service provider is associated with the identity manager and not associated with the particular application service.

* * * * *

UNITED STATES PATENT AND TRADEMARK OFFICE
CERTIFICATE OF CORRECTION

PATENT NO. : 10,341,126 B2
APPLICATION NO. : 15/624592
DATED : July 2, 2019
INVENTOR(S) : Timothy P. Stammers et al.

It is certified that error appears in the above-identified patent and that said Letters Patent is hereby corrected as shown below:

In the Specification

In Column 17, Lines 22-23, delete "Bluetooth™" and insert -- Bluetooth™, --, therefor.

In the Claims

In Column 24, Line 66, in Claim 12, after "the" delete "particular".

Signed and Sealed this
Seventh Day of January, 2020

Andrei Iancu
*Director of the United States Patent and Trademark Office*